United States Patent [19]

Eppink

[11] Patent Number: 5,474,334
[45] Date of Patent: Dec. 12, 1995

[54] COUPLING ASSEMBLY

[75] Inventor: Jay M. Eppink, Spring, Tex.

[73] Assignee: Halliburton Company, Dallas, Tex.

[21] Appl. No.: 284,389

[22] Filed: Aug. 2, 1994

[51] Int. Cl.⁶ ................................................. F16L 35/00
[52] U.S. Cl. .......................... 285/184; 285/333; 285/328; 285/330; 175/74
[58] Field of Search ................................ 285/333, 328, 285/330, 178, 134, 27, 184, 175; 175/74

[56] References Cited

U.S. PATENT DOCUMENTS

| | | | |
|---|---|---|---|
| 1,781,091 | 11/1930 | Wilson | 285/333 X |
| 4,745,982 | 5/1988 | Wenzel | 175/74 |
| 4,762,344 | 8/1988 | Perkins et al. | 285/333 X |
| 4,813,497 | 3/1989 | Wenzel | 285/184 X |
| 4,877,092 | 10/1989 | Helm et al. | 175/74 |
| 4,898,498 | 2/1990 | Akesaka | 175/74 |
| 5,269,385 | 12/1993 | Sihlis | 175/74 |
| 5,343,966 | 9/1994 | Wenzel et al. | 285/184 X |
| 5,368,111 | 11/1994 | Benoit et al. | 175/74 |

*Primary Examiner*—Randolph A. Reese
*Assistant Examiner*—Heather Chun Shackelford
*Attorney, Agent, or Firm*—Conley, Rose & Tayon

[57] ABSTRACT

The coupling assembly includes a first pipe and a second pipe connected by a middle sub splined to an outer sleeve. Each pipe includes a tubular body having a first axis and a threaded pin end with a second axis. The middle sub includes threaded boxes on each end with a center seal bore. The threaded boxes of the middle sub threadingly engage the pin ends of the first and second pipes. The threads on one pin are right-handed and the threads on the other pin are left-handed such that upon rotation of the middle sub and outer sleeve, the pins and boxes will threadingly engage upon the rotation in a common direction. The boxes and pin ends have a common axis. Each of the terminal ends of the first and second pipes include dogs which intermesh upon connection of the coupling for the transmission of The axes of the first and second pipes are at an angle with the common axis so as to cause an offset angle between the first pipe and the second pipe.

19 Claims, 13 Drawing Sheets

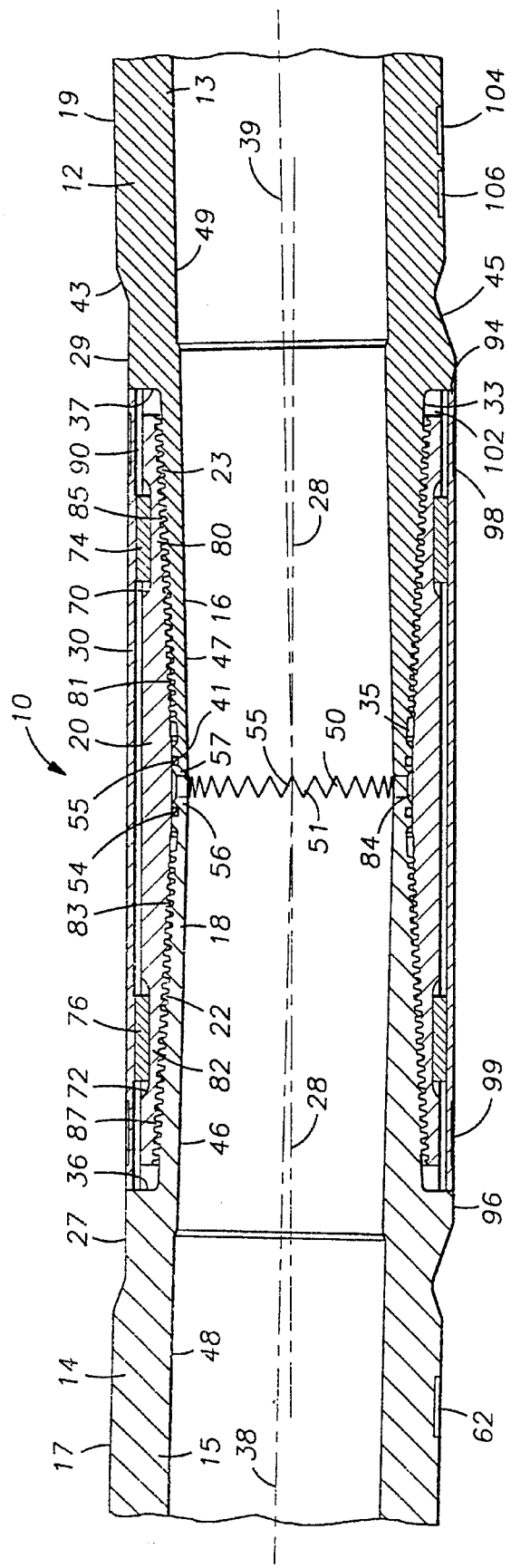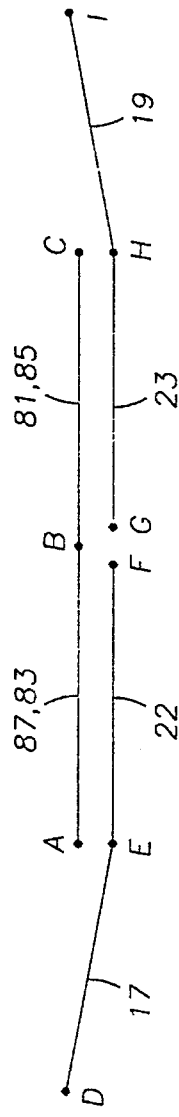
FIG. 1A
FIG. 1B

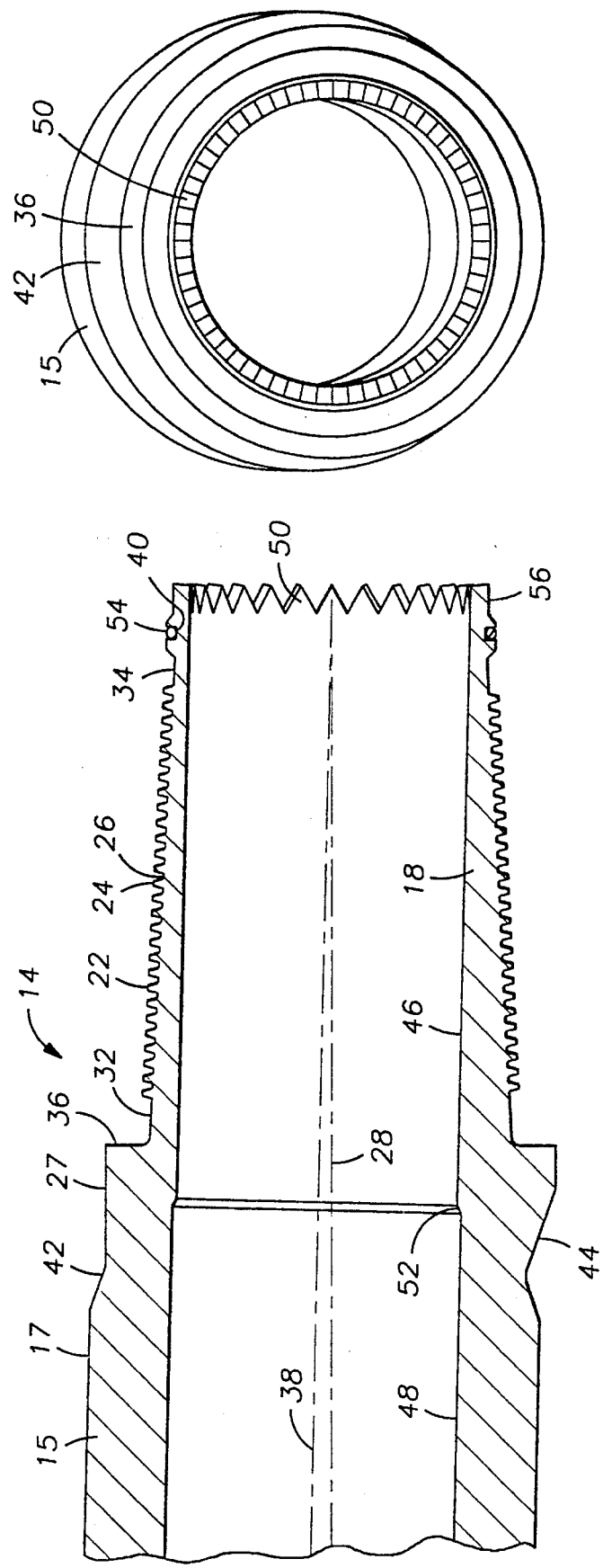

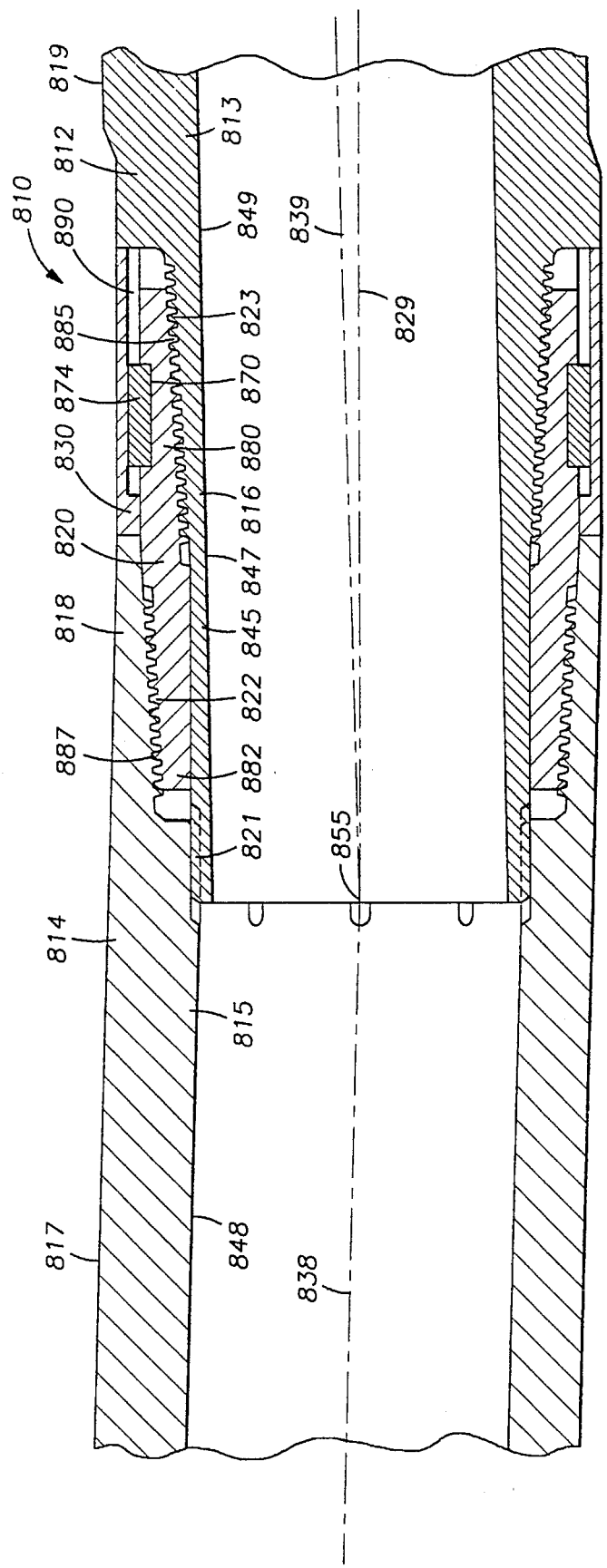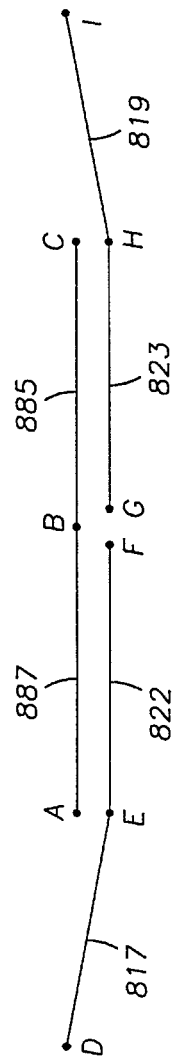
FIG. 18A
FIG. 18B

COUPLING ASSEMBLY

BACKGROUND OF THE INVENTION

This invention relates in general to coupling assemblies for use in drilling directional well boreholes. More specifically, the invention relates to a coupling assembly such as a bent sub for connecting two cylindrical members at an angle whereby the members can be manipulated from the surface to cause the borehole to be drilled in a selected direction.

For various reasons it is desirable to change the direction of the drilling of the borehole of a subterranean well. For example, the change in direction may be required to straighten a well due to the deflection of the drill bit from the desired direction due to particular rock strata. In other instances, the change in direction is intentional in order to reach a formation that is laterally displaced from the existing location of the borehole.

Directional drilling is a procedure employed when it is necessary to change the direction of a borehole. One of the most common methods for changing direction has been the insertion of a bent sub in the drilling string at a point above a downhole motor which drives the rotary drill bit. The downhole drilling motor uses the energy of drilling fluid flowing through the drill string to rotate the bit. Such motors may be turbine motors or progressive cavity motors. The latter type of motor usually has a rotor connected to a bearing shaft by a connecting rod. The motor, the connecting rod, and the bearing shaft are housed within a motor housing, a connector housing, and a bearing housing, respectively.

The bent sub is rigidly connected at one end to the drilling string and has its other end angularly disposed relative to the axis of the drilling string so that when the motor and supported drill bit are rigidly supported by the other end of the bent sub, the rotational axis of the drill bit is angularly inclined relative to the axis of the drilling string. The slight angle deviation from the longitudinal axis of the drilling string caused by the bent sub is often referred to as the off set angle. The bent sub may also be used to connect the motor housing to the bearing housing.

In practice, a vertical borehole is drilled to a predetermined depth and then the drill string is withdrawn to insert a bent sub having the desired off set angle between the end of the drill string and the downhole motor. The drill string is then tripped back into the borehole such that the longitudinal axis of the drill bit is now at an angle to the original borehole thereby altering the direction of the borehole. Typically, each bent sub has an off set angle ranging from about one-quarter of one degree in one-quarter degree increments to about two degrees.

A typical bent sub consists of a tool joint with a tubular section having threaded ends. The axis of the threaded ends is coincident with the axis of the tubular section. The axis of the opposite end is at an angle to the axis of the tubular section. When the bent sub is used to connect pipe sections, the axis of adjacent drill pipe sections will have the angle imposed with respect to each other established by the bent sub. The bent sub, when used with a downhole motor, usually is placed between the drill collars which are used to impart the desired weight on the bit and the downhole motor.

To effect a desired change in drilling angle, which generally is on the order of a fraction of a degree, it is necessary to remove the motor and drill bit from the end of the drill string and either replace the bent sub with another bent sub having the desired angular deviation or to use an adjustable bent sub or housing. U.S. Pat. No. 4,522,272 discloses a bent housing for incorporation in a drilling string which is adjustable to provide a range of angular positions of the rotary drill bit relative to the axis of the drilling string.

U.S. Pat. No. 4,077,657 is directed to an adjustable bent sub for selectively setting the axial alignment of pipe sections from axial coincidence to an obtuse angle between the pipe sections. The bent sub is in two separate cylindrical parts. The adjacent ends of the parts are formed so that the facing or mating ends are each at a mating plane which is at the same acute angle to the axis of the pans where they are coincident. In one position, the axis of the parts are coincident with each other. By rotating one of the pans about the axis of the other pan, the axis will become inclined relative to each other. Each of the mating pans has teeth that engage one another and the pans are marked off so that the degree of inclination may be adjusted per the indicator marks by rotatively moving one mating part relative to the other. A threaded internal mandrel locks one part of the bent sub to the other pan.

U.S. Pat. No. 4,745,982 is also directed to a bent sub used in directional drilling. The bent sub includes an elongated main mandrel which has a fixed bent angle from the longitudinal axis thereof. Mounted to the exterior of the mandrel is a sleeve in a bent sub housing. The ends of the sleeves and the housing face one another and have a dog clutch arrangement with teeth for inter-engagement of the sleeve and the housing. Any given position between the sleeve and the housing with the teeth engaged is maintained in that position by retaining threaded sleeves which axially lock the sleeve and the housing together.

U.S. Pat. No. 4,813,497 utilizes the bent sub of U.S. Pat. No. 4,745,982 with the addition of indicating means between the adjustable pans of the bent sub to indicate the rotational position of a second member with respect to a first member of the bent sub.

U.S. Pat. No. 4,817,740 is directed to a tool which affects change in the direction of a downhole rotary drilling tool and includes a bent housing disposed between the bottom end of a downhole motor and a tubular housing connected to the drilling tool. The bent housing is angularly adjustable relative to the motor housing and the connecting housing is provided with an eccentric external surface upon which an annular eccentric stabilizer is adjustably mounted. The degree of angulation between the motor and the stabilizer is controlled by a series of annular split rings with different thicknesses. The split ring is disposed between the motor and the stabilizer. If a change of inclination is required between the motor and the stabilizer, a thicker or thinner ring is placed between the motor and the eccentric member. After the ring change, the three sections are tightened together against the ring.

Other U.S. patents describing connections with downhole motors include U.S. Pat. Nos. 5,168,943; 5,048,621; 5,052,501; 5,029,654; 4,067,404; and 4,641,717.

Prior art bent subs lack the ability to take high torsional and bending impact loads without the connections backing off or fatigue cracking. Prior art bent subs also do not provide positive stops. The present invention overcomes the deficiencies of the prior art.

SUMMARY OF THE INVENTION

The coupling assembly includes a first pipe and a second pipe connected by a middle sub splined to an outer sleeve. Each pipe includes a tubular body having a first axis and a threaded pin with a second axis. The middle sub includes threaded boxes on each end with a center seal bore. The threaded boxes of the middle sub threadingly engage the pins of the first and second pipes. The threads on one pin are right-handed and the threads on the other pin are left-handed such that upon rotation of the middle sub and outer sleeve, the pins and boxes will threadingly engage upon the rotation in a common direction. The threads on the boxes and pins have a common axis. Each of the terminal ends of the first and second pipes include dogs which intermesh upon connection of the coupling for the transmission of torque. The axes of the first and second pipes are at an angle with the common axis so as to cause an offset angle between the first pipe and the second pipe.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 1A is a cross-sectional view of a first embodiment of the adjustable angle coupling assembly of the present invention;

FIG. 1B is a diagram representing the axes of the threaded connections of the pipes and sleeve and the axes of the outer cylindrical surface of the pipes of the coupling assembly of FIG. 1A;

FIG. 2 is a cross-sectional view of the lower cylindrical member of the coupling assembly shown in FIG. 1;

FIG. 3 is an end view of the lower cylindrical member of FIG. 2;

FIG. 18A is a cross-sectional side view of a third embodiment of a coupling assembly of the present invention; and FIG. 18B is a diagram representing the axes of the threaded connections of the pipes and sleeve and the axes of the outer cylindrical surfaces of the pipes of the coupling assembly of FIG. 18A.

DESCRIPTION OF THE PREFERRED EMBODIMENT

Figure 6:
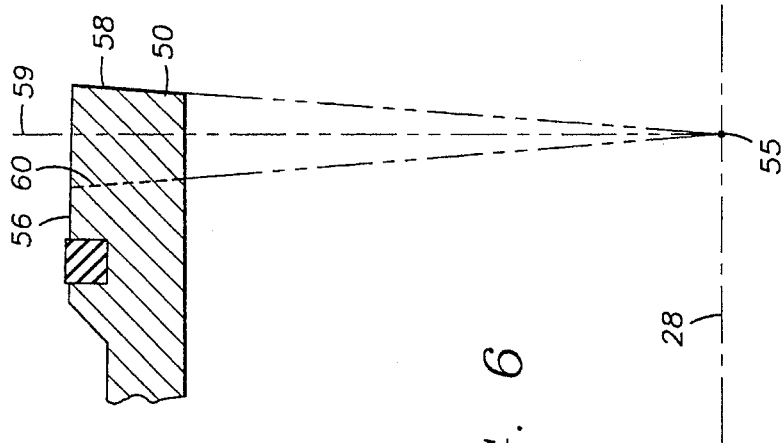
FIG. 6 is a cross-sectional side elevation view of one of the dogs shown in FIG. 5.
Figure 5:
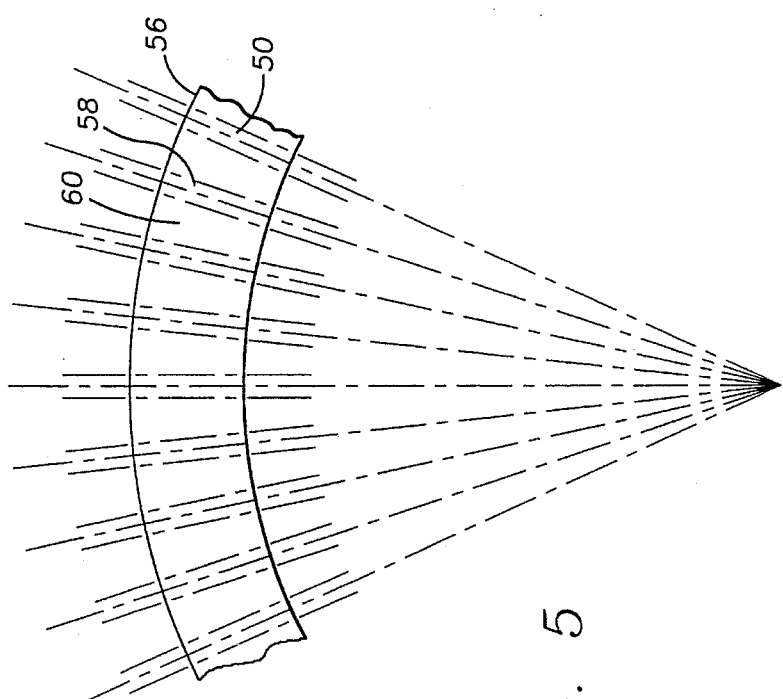
FIG. 5 is an end view of the dogs shown in FIG. 2.
Figure 4:
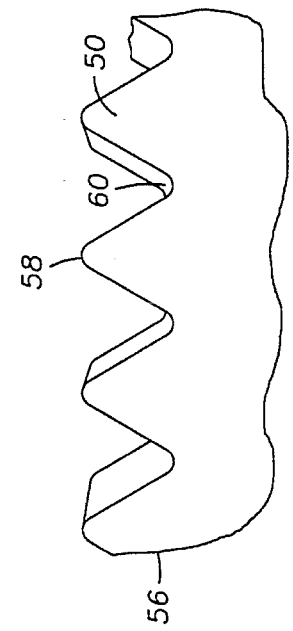
FIG. 4 is an enlarged perspective view of the dogs shown on the lower cylindrical member of FIG. 2.

Referring initially to FIG. 1, the coupling assembly 10 of the present invention attaches or connects two cylindrical members for the purpose of angularly inclining one with respect to the other, i.e. creating an offset angle. The cylindrical members may be any two members including by way of illustration, and not by way of limitation, tubes, pipes, housings, or combinations thereof. The coupling assembly 10 may be used to attach the housing of a downhole motor to a pipe section. For example, the upper housing of the coupling assembly 10 may make up into the stator of a downhole motor and the lower housing of coupling assembly 10 may be made up into the bearing assembly which takes the load from the drill bit to the power section of the downhole motor. The coupling assembly 10 may also be used in a tandem motor where the coupling assembly constitutes the middle housing between two power sections of the motor. The coupling assembly 10 of the present invention may also be connected in a string of drill pipe to ensure the alignment of the connection between two pipe sections such as for example, to assure the alignment of wire line connectors used in measurement while drilling applications. Further, the coupling assembly 10 is adjustable and therefore can be used above the downhole motor for adjusting the angle of the tool face. Although the coupling assembly 10 of the present invention is preferably adjustable, the coupling assembly 10 can be a constant angle coupling where the plane at the top of the assembly is adjustable so that, for example, it is the same as the plane at the bottom of the assembly.

For purposes of description, and not by way of limitation, coupling assembly 10 shall be described as connecting a first cylindrical pipe 12 to a second cylindrical pipe 14. The coupling assembly 10 further includes a sub 20 and a sleeve 30. As further described in detail, the threaded pins 16, 18 of pipes 12, 14, respectively, threadingly engage sub 20 with sleeve 30 being disposed around the outer circumference of sub 20 causing sub 20 to be intermediately disposed between outer sleeve 30 and threaded pins 16, 18. As will be appreciated in the description of the alternative embodiments of coupling assembly 10, the relationship of pins 16, 18 with respect to sub 20 and sleeve 30 may be comprised of various configurations. Thus, the relationship of these members as shown in FIG. 1 is merely illustrative of one preferred embodiment of the present invention.

For a detailed description of the individual members of coupling assembly 10, reference will now be made to FIGS. 1–10. In one form of the preferred embodiment, first pipe 12 is in a position closer to the surface and thus higher in the pipe string than second pipe 14 which is closer to the bottom of the wellbore. First pipe 12 may be referred to as the upper sub or pipe 12 and the second pipe 14 may be referred to as the lower sub or pipe 14. Since upper and lower pipes 12, 14 are substantially identical in construction, lower pipe 14 will be described in detail and will aim serve as a description of upper pipe 12. The differences between upper and lower pipes 12, 14 will be set forth with particularity.

Referring now to FIGS. 2 and 3, the threaded pin 18 of lower pipe 14 includes threads 22 around its outer diameter. The outer diameters of threads 22 form a conical shape and have a pitch diameter, i.e. mean thread diameter, which is also conical in shape. The conical shape generated by the outer diameter and pitch diameter of threads 22 has a common axis 28. Threads 22 are modified Acme threads. Threads 22 are full height threads with crests 24 and roots 26 at a taper with the axis 28. Threads 22 terminate at inner stress relief groove 32 at one end and at outer thread groove 34 at the other end. Inner stress relief groove 32 assists in the formation of annular abutment shoulder 36 and relieves the stress riser at the base of shoulder 36. Outer thread groove 34 is used for the cutting of threads 22.

The diameter of the outer cylindrical surface 17 of the main body 15 of lower pipe 14 is greater than the largest diameter of threads 22 located adjacent inner stress relief groove 32. Such increase in diameter forms annular abutment shoulder 36 for engagement with outer sleeve 30 as hereinafter described. The annular area 27 around the circumference of pipe 14 adjacent shoulder 36 is concentric with the diameter of threads 22, i.e. has a common axis 28. A groove 40 is formed adjacent thread groove 34 for housing an elastomeric sealing member 54 such as an o-ring. The diameter of inner cylindrical surface 46 of pin 18 may be less than the diameter of inner cylindrical surface 48 of the main pipe body 15 thereby forming an annular transition 52. Outer cylindrical surface 17 and inner cylindrical surfaces 46, 48 are concentric and all have a common axis 38. As shown in FIG. 1A, the axis 38 of the cylindrical surfaces 17, 46, and 48 diverges from the axis 28 of the conical shape formed by the diameter of threads 22 of pin 18. This diversion of axes forms a step 42 in the direction of the diversion of axis 28 forming the low side or inside bend of pipe 14 and a step 44 facing the opposite direction at the opposite side forming the high side or outside bend of pipe 14.

Likewise, as shown in FIG. 1A, upper pipe 12 includes modified Acme threads 23 extending from inner stress relief groove 33 to outer thread groove 35. Inner stress relief groove 33 with the larger diameter annular area 29 of pipe 12 forms an axially facing annular shoulder 37. An annular seal ring groove 41 is also formed adjacent the nose 57 of pin 16 to house an elastomeric sealing member 55. Upper pipe 12 also includes axially projecting dogs 51 for matingly engaging dogs 50 on lower pipe 14. Steps 43 and 45 are also formed on upper pipe 12.

The conical shape formed by the outer diameters of threads 23 of pin 16 of upper pipe 12 and the conical shape of the pitch diameter of threads 23 have the common axis 28 as shown in FIG. 1A. The annular area 29 around the circumference of pipe 12 adjacent shoulder 37 is concentric with the threads 23, i.e. have the common axis 28. The outer cylindrical surface 19 and the inner cylindrical surface 49 of the main pipe body 13 and the inner cylindrical surface 47 of pin end 16 of pipe 12 are concentric and have a common axis 39.

The principal difference between lower pipe 14 and upper pipe 12 is that threads 22 and 23 are threaded in the opposite direction. By way of example, and not by limitation, threads 22 may be left-hand threads with threads 23 being righthand threads. Such opposite threads are required for threaded engagement with sub 20 as hereinafter described in further detail.

Referring now to FIGS. 2–6, there is shown a plurality of teeth, splines or dogs 50 projecting axially on the terminal end or nose 56 of pin 18. Dogs 50 include a crests 58 and roots 60. Crests 58 and roots 60 extend in a radial direction from the radial center 55 of pin 18. Referring particularly to FIG. 6, there is shown a side cross-sectional elevation view of a dog 50. The center line 59 of dog 50 passes through center 55 of pin 18. The plane formed by each crest 58 and the plane formed by each root 60 also passes through center 55 causing the planes of the individual crests 58 and roots 60 to be at an angle to the center line 59 of dog 50. In one preferred embodiment, there are 30 dogs equally spaced about the pin noses 56 and 57 having a 30 degree flank angle. In this embodiment with 30 teeth and with a 30 degree flank angle, the angle between the planes is approximately five degrees. Such an angle of the crests 58 and roots 60 is required so that the crests and roots of dogs 50 on the pin nose 56 of lower pipe 14 properly mesh with the crests and roots of dogs 51 on the pin nose 57 of pin 16 of upper pipe 12. The 30 teeth or dogs 50 will allow a bend in coupling assembly 10 in the range of 0 to 2-½ degrees and in approximately ¼ degree increments which will move the plane of the tool face from 0 to 180 degrees. If 36 dogs were equally spaced about the pin noses 56 and 57, the bend in coupling assembly 10 would be in the range of 0 to three degrees and approximate ¼ degree increments. The rotation one dog 50, 51 between upper pipe 12 and lower pipe 14 will change the bend angle a fraction of a degree. Such is not a straight line function and the exact amount of change in the bend angle will depend upon the particular geometric positions of the main pipe bodies 13, 14 of pipes 12, 14 with sub 20. The above were picked to be the closest approximation that will allow ¼ degree increments through the range of angles with a reasonable member of teeth.

Figures 7, 8:
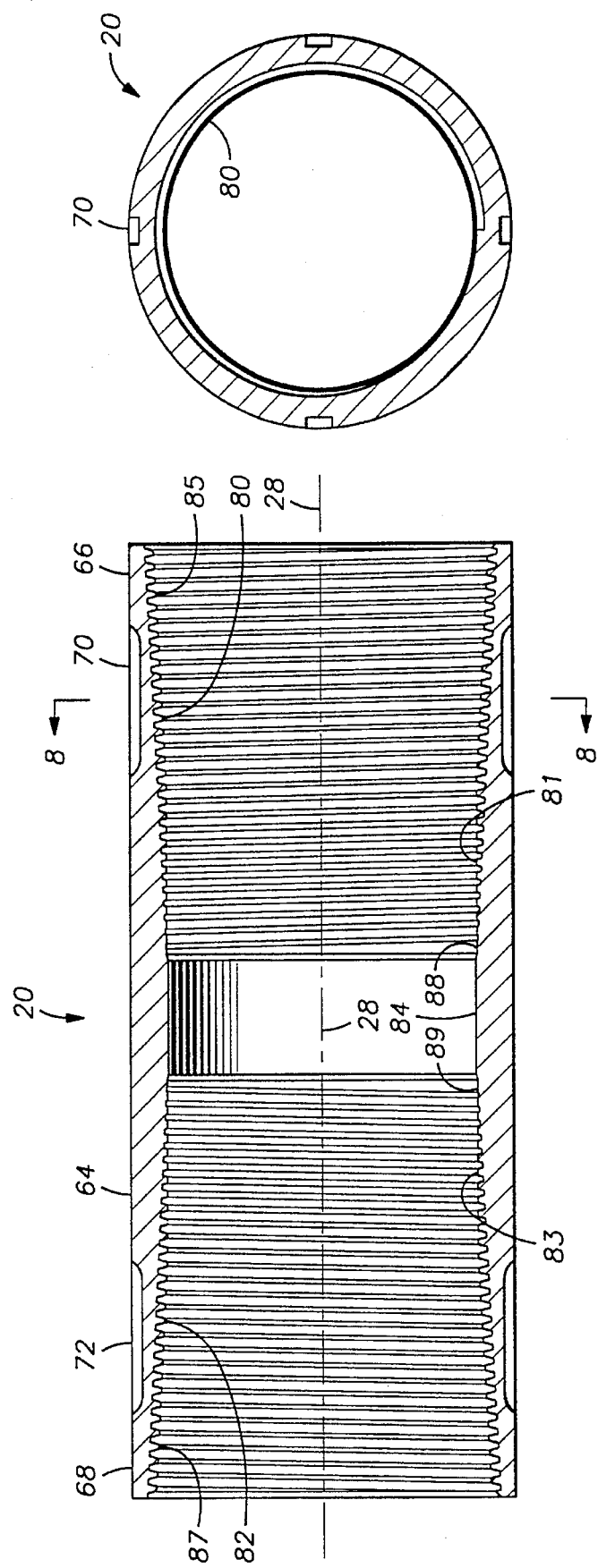
FIG. 7 is a cross-sectional view of the sub of the coupling assembly shown in FIG. 1.
FIG. 8 is a cross-sectional view at plane 8—8 shown in FIG. 7.

Referring now to FIGS. 7 and 8, there is shown sub 20 having the common axis 28 with the outer diameters of pins 16, 18. Sub 20 is generally cylindrical with an outer cylindrical surface 64 having a diameter less than the outer diameter of upper and lower pipes 12, 14 at the outer areas 27, 29 of shoulders 36, 37, respectively. Adjacent the terminal ends 66, 68 of sub 20 are located a plurality of aligned pairs of slots 70, 72, respectively, for receiving keys 74, 76, best shown in FIG. 1A.

The inner periphery of sub 20 includes a first conical threaded box 80 adjacent terminal end 66 and a second conical threaded box 82 adjacent end 68. The axes of the conical shapes formed by the diameters of the threads of boxes 80, 82 is the common axis 28. A center cylindrical sealing bore 84 is disposed between boxes 80, 82 at the center of sub 20. The threads of boxes 80, 82 are modified Acme threads. Note that the inner threaded sections 81, 83 of the threads of boxes 80, 82 are vanishing or run-out threads reducing in height from full height threads 85, 87 to a vanishing point at 88, 89. The use of run-out threads 81, 83 permits the maximum cross-sectional area of sub 20 adjacent seal bore 84. Further, the threads of the boxes 80, 82 are threaded either in the left-hand or right-hand direction to properly threadingly engage threads 22, 23 of upper and lower pipes 12, 14, respectively. Thus, if box 80 of sub 20 receives pin 16 of upper pipe 14 and threads 23 are right-hand threads, then the threads 81, 85 of box 80 are also right-hand threads. Likewise, where threads 23 are right-hand threads, then threads 22 on pin 18 of lower pipe 14 must be left-hand threads. Therefore, the threads 83, 87 of box 82 must also be left-hand threads to threadingly engage the left-hand threads 22 of pin 18 of lower pipe 14.

Figures 9, 10:
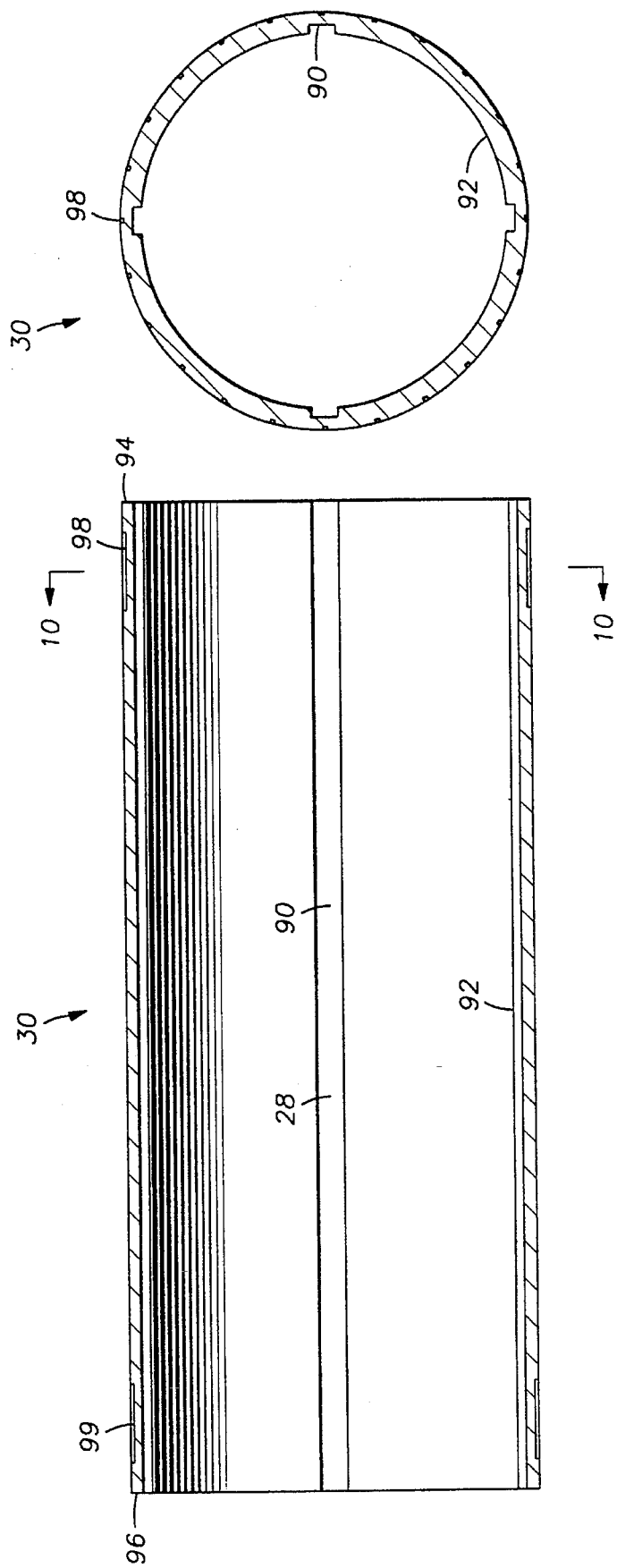
FIG. 9 is a cross-section side elevational view of the outer sleeve of the coupling assembly of FIG. 1.
FIG. 10 is a cross-sectional view at plane 10—10 shown in FIG. 9.

Referring now to FIGS. 9 and 10, there is shown outer sleeve 30 having the axis 28 common with sub 20 and the conical shapes of the threads of pins 16, 18. Outer sleeve 30 is cylindrical and includes a plurality, preferably four, key ways 90 circumferentially spaced about the inner cylindrical surface 92 of sleeve 30. Adjacent each terminal end 94, 96 of sleeve 30 are circumferentially disposed a plurality of alignment grooves 98, 99, respectively.

Referring again to FIG. 1A, upon assembly of coupling assembly 10, keys 74, 76 are disposed in key slots 70, 72, respectively, of sub 20. The key ways 90 of outer sleeve 30 are then aligned with keys 74, 76 and sub 30 is inserted into the bore 102 of outer sleeve 30 with key ways 90 receiving keys 74, 76. The keys 74, 76 disposed in slots 70, 72, respectively, are received within key ways 90 and thus prevent outer sleeve 30 from rotating with respect to sub 20. However, sub 20 may move axially with respect to outer sub 30 depending upon the differing thread alignment between sub 20 and pins 16, 18.

The axis 28 of the outer conical shapes of lower and upper pins 18, 16 are aligned with the axis 28 of the inner conical shapes of the threads of boxes 80, 82 of sub 20 and outer sleeve 30. Pins 16, 18 of upper pipe 12 and lower pipe 14 are simultaneously inserted into the boxes 80, 82, respectively, of sub 20. Outer sleeve 30 is then rotated to rotate sub 20 causing the right-hand threads 23, 81, 85 of pin 16 and box 80 to engage simultaneously with the engagement of the left-hand threads 22, 83, 87 of pin 18 and box 82. The threading engagement continues until the axially facing shoulders 36, 37 of lower and upper pipes 14, 12 engage the terminal ends 94, 96, respectively, of outer sleeve 30. The engagement of ends 94, 96 of outer sleeve 30 with shoulders 36, 37 of pipes 14, 12 provides a metal-to-metal seal for coupling assembly 10. At the thread tight position, elastomeric seal members 54, 55 adjacent the noses 56, 57 of upper and lower pipes 12, 14 sealingly engage the sealing bore 84 of sub 20. Elastomeric seal members 54, 55 provide a secondary seal for coupling assembly 10 to keep out deleterious material. Further, the axially projecting dogs 50, 51 on the noses 56, 57 of upper and lower pipes 12, 14 intermesh to prevent any further relative rotation between upper and lower pipes 12, 14. Thus, upper and lower pipes 12, 14 become locked together upon the makeup of coupling assembly 10. The coupling assembly 10 is then made up to a specified torque.

As shown in FIG. 1A, upon final makeup of box 82 and pin 18 and box 80 and pin 16, the full height threads 87 and run-out threads 83 of box 82 threadingly engage threads 22 of pin 18. The diameters of engaged threads 87, 83, and 22 form a concial shape having the common axis 28. Further, as shown in FIG. 1A, the full height threads 85 and run-out threads 81 of box 80 threadingly engage the threads 23 of pin 16. The diameters of the engaged threads 85, 81, and 23 also form a conical shape having the common axis 28.

Referring now to FIG. 1B, there is schematically shown the relationship of the threads of boxes 80, 82, the threads of pins 16, 18, and the outer cylindrical surfaces of pipe bodies 13, 15. Axis AB represents the axis of threads 87, 83 of box 82 and axis BC represents the axis of threads 81, 85 of box 80. Axes AB and BC coincides with axis 28. Axis EF represents the axis of threads 22 and axis GH represents the axis of threads 23. Axes EF and GH also coincide with axis 28. Thus, in the engaged position, the conical shapes formed by the engagement of threads 87, 83 and 22 of box 82 and pin 18, and the engagement of threads 81, 85 and 23 of box 80 and pin 16 both coincide with common axis 28. Axis DE represents the axis of outer cylindrical surface 17 of pipe body 15, which is axis 38, which deviates from axes AB and EF, i.e. axis 28, as shown. Further, axis HI of the cylindrical surface 19 of pipe body 13, which is axis 39, deviates from axes BC and GH, i.e. axis 28, as shown. In summary, the conical shapes formed by the connections of pin 18 and box 82 and the axes of the connection of box 80 and pin 16 deviate from the axes formed by the outer cylindrical surfaces 17, 19 of pipe bodies 15 and 13, respectively. As will be shown in subsequent embodiments to be described, the point of deviation of the threaded connections and the outer cylindrical surfaces of the pipe bodies may vary.

Referring again to FIG. 1A, the axis 38 of concentric cylindrical surfaces 17, 48 and 46 crosses with axis 39 formed by concentric cylindrical surfaces 19, 49 and 47 at center point 55. The deviation of axis 38 of lower pipe 14 with axis 39 of lower pipe 12 forms a bend angle at the center 55 of the dogs 50, 51. The bend angle may be changed by the realignment of axis 39 with respect to axis 38 through the re-alignment of the connection of upper pipe 12 with respect to lower pipe 14 in the makeup of coupling assembly 10 as hereinafter described.

The coupling assembly 10 is preferably used as an adjustable bent sub. The upper pipe 12 includes a plurality of tool face marks 106 and 104, respectively, which are scribed at specific locations to indicate the angle and direction of the tool face. Scribe marks 106 are azimuthally spaced about the circumference of upper pipe 12. The scribe marks 106 are aligned with alignment indicators 98, 99 on outer sub 30 which in turn are aligned with indicator 62 on lower sub 14 to determine the bend angle of coupling assembly 10 which in turn determines the angle and direction of the tool face indicated at tool face marks 104.

In order to introduce a desired angular bend between upper pipe 12 and lower pipe 14, coupling assembly 10 is disconnected by first rotating outer sleeve 30 and thus sub 20 until dogs 50 and 51 disengage. Upon disengagement of dogs 50 and 51, one of the pipes 12, 14 is rotated with respect to the other a predetermined angular distance to produce the desired bend angle as shown by scribe marks 106 thus providing the desired vertical angular displacement and direction of the tool face as shown at tool face marks 104. The teeth 50 and 51 are engaged at the new location by rotating outer sleeve 30 until the dogs 50, 51 re-engage. Upon their reengagement, outer sleeve 30 and thus sub 20 are rotated and torqued up, while supporting either upper or lower pipe 12, 14 to complete the re-assembly of coupling assembly 10.

The geometric alignments between upper and lower pipes 12, 14 to achieve the desired angular bend to properly align and direct the tool face are well known in the art. Such geometry is described in detail in U.S. Pat. No. 4,077,657, incorporated herein by reference.

The present invention provides a positive stop between dogs 50, 51 to maintain the connection of upper and lower pipes 12, 14 and prevent pipes 12, 14 from backing off upon utilization downhole as part of a drill pipe string. Such positive stops maintain a high bending strength at coupling assembly 10. The intermeshing of dogs 50, 51 allows impact loading on the coupling assembly 10 so as not to cause slippage of the connection between upper and lowers pipes 12, 14. Further, the torsional strength of coupling assembly 10 is more than one and one half times as strong as conventional rotary shouldered connections of the same material with the same diameters and same material cross-sections. The coupling assembly 10 of the present invention allows for an incremental adjustable angle of the connection with respect to the axis of the pipes 12, 14 while still maintaining a high torque capacity and allowing no slippage between pipes 12, 14 from impact loading.

Figure 11A:
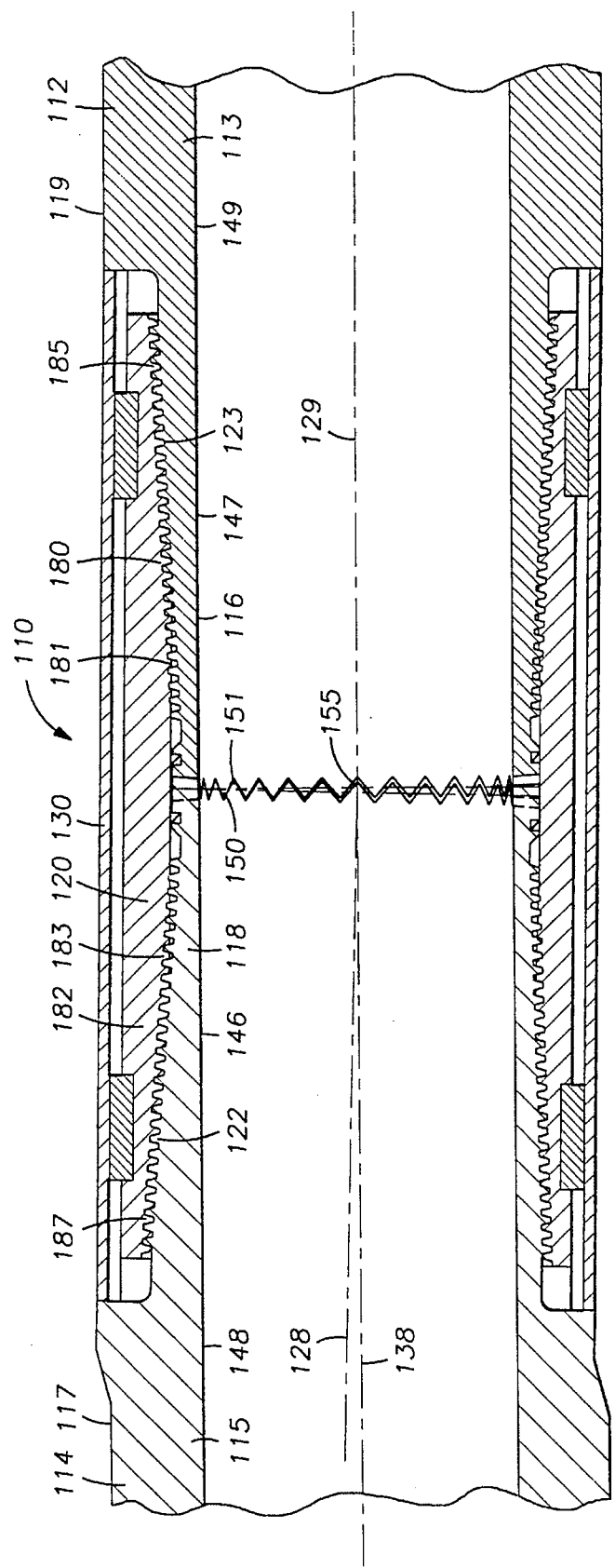
FIG. 11A is a cross-sectional side view of the first embodiment of the adjustable angle coupling assembly of the present invention with first modified axes of the threaded connections and outer pipe surfaces.

Referring now to FIG. 11A, there is shown an alternative to the adjustable angle coupling of FIGS. 1–10 with first modified axes of the threaded connections and outer pipe surfaces. Adjustable angle coupling 110 includes an upper pipe 112 and a lower pipe 114 connected by sub 120 and outer sleeve 130. Upper pipe 112 includes a pin 116 extending from main pipe body 113 and lower pipe 114 includes a pin 118 extending from a main pipe body 115. The inner cylindrical surface 147 of pin 116 and the inner and outer cylindrical surfaces 149, 119, respectively, of pipe body 113 have a common axis 129. Pin 116 includes threads 123 having diameters forming a conical shape with an axis common to axis 129. The inner cylindrical surface 146 of pin end 118 and inner and outer cylindrical surfaces 148, 114, respectively, of main pipe body 115 have a common axis 138 which is parallel with and can be in line with axis 129 in the zero angle position shown. The pin 118 includes threads 122 having diameters forming a conical shape. The conical shape of the threads 122 have a common axis 128. Sub 120 includes a threaded box 180 having threads 181, 185 which threadingly engage threads 123 of pin 116 and a threaded box 182 having threads 187, 183 which threadingly engage threads 122 of pin 118. The conical shape of the diameters of threads 183, 187 of box 182 and the conical shape of the diameters of threads 181, 185 on box 180 both have an axis common with axis 128 (when in the zero angle position shown.) The threads on pin 116 and box 180 may be either left-hand or right-hand threads with the threads on pin 118 and box 182 being threaded in the opposite direction.

As shown in FIG. 11A, upon final make up of box 180 and pin 116 and box 182 and pin 118, the full height threads 185 and run-out threads 181 of box 180 threadingly engage threads 123 of pin 116. The conical shape formed by the diameters of engaged threads 181, 185, and 123 have as their axis, axis 129. Simultaneously with the engagement of threads 181, 185, and 119, the full height threads 187 and run-out threads 183 of box 182 threadingly engage the threads 122 of pin 118. The conical shape formed by the diameters of engaged threads 187, 183, and 122 have as their axis, axis 128.

Figure 11B:
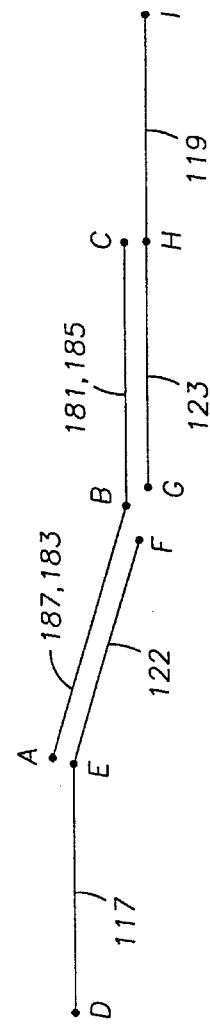
FIG. 11B is a diagram representing the axes of the threaded connections of the pipes and sleeve and the axes of the outer cylindrical surface of the pipes of the coupling assembly of FIG. 11A.

Referring now to FIG. 11B, there is schematically shown the relationship of the threads of boxes 180, 182, the threads of pins 116, 118, and the outer cylindrical surfaces of pipe bodies 113, 115. Axis AB represents the axis of threads 187, 183 of box 182 and axis BC represents the axis of threads 181, 185 of box 180. As distinguished from the embodiment of FIGS. 1– 10, axis AB and BC are at an angle. Axis AB is axis 128 and axis BC is axis 129. Axis DE represents the axis of outer cylindrical surface 117 of pipe body 115 and is common to axis 138. Axis EF represents the axis of the conical shape formed by threads 122 of pin 118. As shown, axis AB and axis EF coincide and have as their axis, axis 128. Axis GH represents the axis of the conical shape formed by threads 123 of pin 116 and the axis HI represents the axis of the outer cylindrical surface 119 of pipe body 113. Axis GH and HI coincide with the axis BC of box threads 181, 185 and have as their common axis, axis 129. Although the axis 138 of the outer cylindrical surface 117 of pipe body 115 does not coincide with axis 129, axis 138 is parallel with and may be in line with axis 129 as shown in FIG. 11B. In summary, the conical shape formed by the connection of pin 116 and box 180 coincides with the axis of outer cylindrical surface of pipe body 113. However, as distinguished from the embodiment of FIGS. 1–10, the axis of the conical shape formed by the connection of pin 118 and box 182 is at an angle with axis 129 and axis 138.

Referring again to FIG. 11A, axis 129 crosses axis 128 at center point 155. The deviation of axis 128 with axes 129 and 138 forms a bend angle at center 55. Thus, in this embodiment, the bend angle is formed by different points of deviation between the threaded connections and the outer cylindrical surfaces of the pipe bodies. Upper pipe 112 includes dogs 151 meshing with dogs 150 on lower pipe 114 such that upon rotation and angular displacement of dogs 150 with respect to dogs 151, the offset angle of the tool face may be changed. Axis 128 diverges from axis 129 at bend point to form the bend angle of coupling assembly 110. As illustrated in FIG. 11B, coupling assembly 10 is shown in the zero bend angle position such that axis 138 of lower pipe 114 is parallel to and can be in line with the axis 129 of upper pipe 112. However, as lower pipe 114 is rotated with respect to upper pipe 112, axis 128 will diverge from axes 129 and 138 forming a bend angle greater than zero degrees.

Figure 12A:
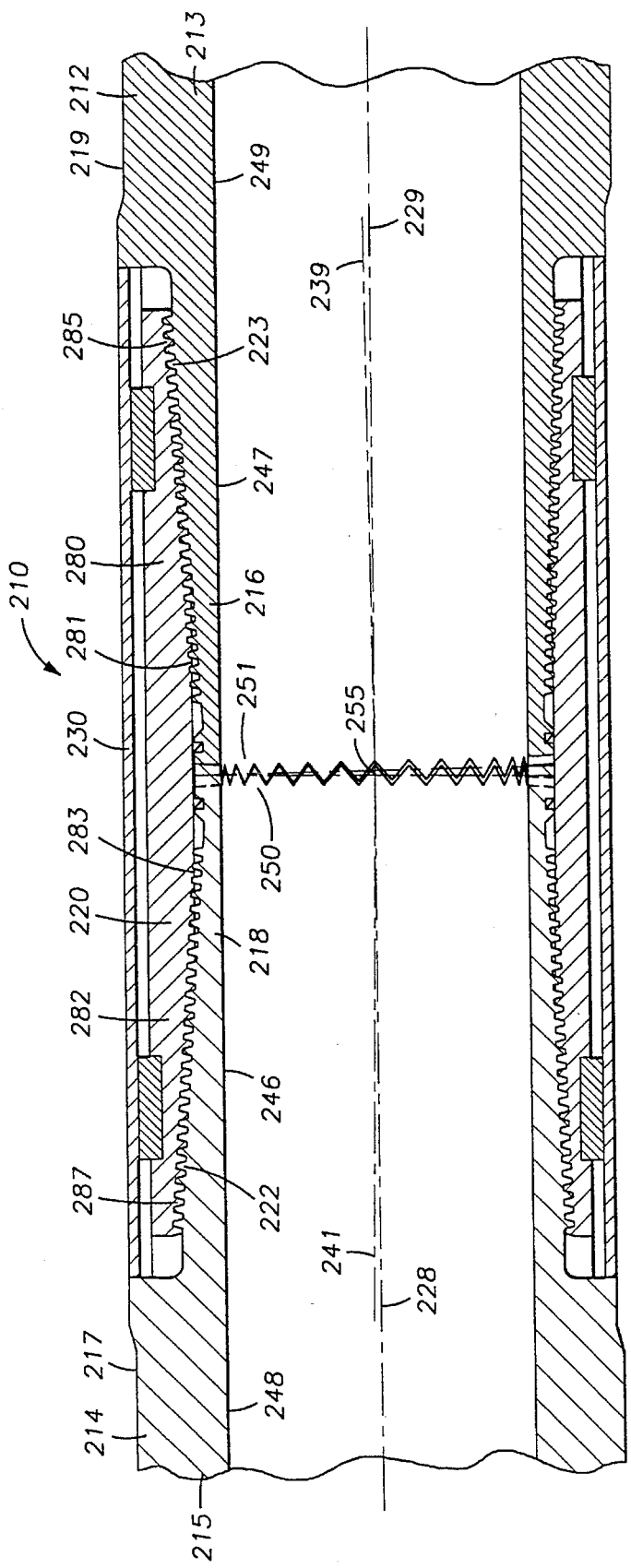
FIG. 12A is a cross-sectional side view of the first embodiment of the adjustable angle coupling assembly of the present invention with a second modified axes of the threaded connections and outer pipe surfaces.

Referring now to FIG. 12A, there is shown another alternative embodiment of the adjustable angle coupling with a second modified axes of the threaded connections and outer pipe surfaces. Coupling 210 includes an upper pipe 212 and a lower pipe 214 connected together by a sub 220 and outer sleeve 230. In this embodiment the inner cylindrical surface 247 of pin 216 and the inner and outer cylindrical surfaces 249, 219 of pipe body 213 have a common axis 229. The conical shape formed by threads 281, 285 of box 280 and the conical shape formed by threads 223 of pin 216 have a common axis 239. The inner cylindrical surface 246 of pin 218 and the inner and outer cylindrical surfaces 248, 217 of pipe body 215 of lower pipe 214 have a common axis 228. The conical shape formed by threads 283, 287 of box 282 and the conical shape of threads 222 of pin 218 have a common axis 238.

Figure 12B:
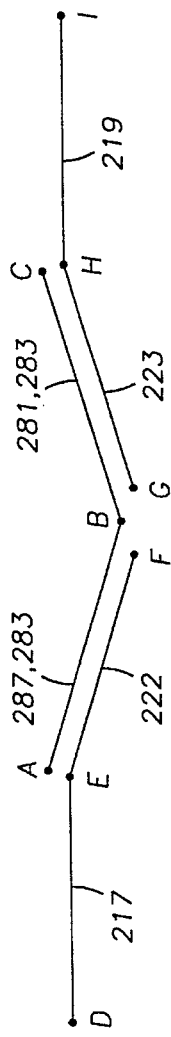
FIG. 12B is a diagram representing the axes of the threaded connections of the pipes and sleeve and the axes of the outer cylindrical surface of the pipes of the coupling assembly of FIG. 12A.

Referring now to FIG. 12B, there is schematically shown the relationship of the threads of boxes 280, 282, the threads of pins 216, 218, and the outer cylindrical surfaces of pipe bodies 213, 215. Axis AB represents the axis of threads 287, 283 of box 282 and axis EF represents the axis of threads 222 of pin 218. Axes AB and EF coincide and have the common axis 238. Axis BC represents the axis of threads 281, 285 of box 280 and axis GH represents the axis of threads 223 of pin 216. Axes BC and GH coincide and have the common axis 239. As shown, axes 238 and 239 diverge at center 255 to form the bend angle of coupling 210. Axis DE of outer cylindrical surface 217 of pipe body 215 is axis 228 and axes HI of the outer cylindrical surface 219 of pipe body 213 is axis 229. Axis 228 and 229 will coincide in the zero bend angle position as shown in FIG. 12A. In summary, the axis 238 of the connection between pin 218 and box 282 and the axis 239 of the connection between pin 216 and box 280 are at an angle and both axes 238, 239 are at an angle with axis 228 and 229 of the outer cylindrical surfaces 217, 219 of pipe bodies 215, 213, respectively. The deviations of these axes form the bend angle of coupling 210.

Coupling assembly 210 is shown in FIG. 12A in the zero bend angle position such that the axis 229 of upper pipe 212 is parallel to and can be in line with the axis 228 of lower pipe 214. However, as lower pipe 114 is rotated with respect to upper pipe 112, axis 228 will also diverge from axis 229 forming a bend angle greater than zero degrees. The coupling assembly 210 allows for an infinitely adjustable angle of the coupling assembly by making up to a range of torques.

Figure 13A:
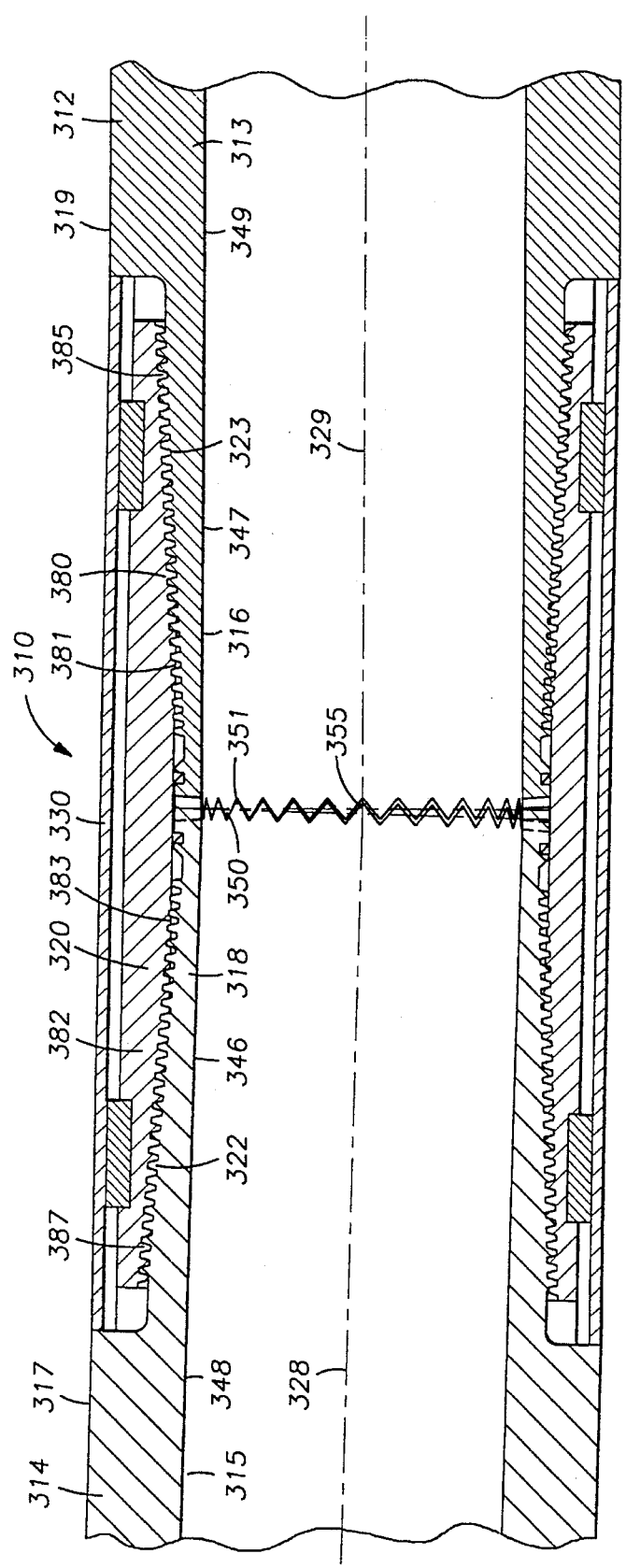
FIG. 13A is a cross-sectional side view of the first embodiment of an angular alignment coupling assembly of the present invention with a third modified axes of the threaded connections and outer pipe surfaces.

Referring now to FIG. 13A, there is shown a first alternative embodiment of the coupling assembly in the form of an angular alignment coupling 310. The bend angle of an angular alignment coupling is not adjustable. Angular alignment coupling 310 includes an upper pipe 312 and a lower pipe 314 connected by a sub 320 and an outer sleeve 330. In this embodiment, the inner cylindrical surface 347 of pin 316, the inner and outer cylindrical surfaces 349, 319 of pipe body 313, the conical shapes of threads 381, 385 of box 380, and the conical shape of threads 323 of pin 316, all have a common axis 329. The inner cylindrical surface 346 of pin 318, the inner and outer cylindrical surfaces 348, 317 of pipe body 315 of lower pipe 314, the conical shape of threads 387, 383 of box 382, and the conical shape of threads 322 of pin 318, all have a common axis 328.

Figure 13B:
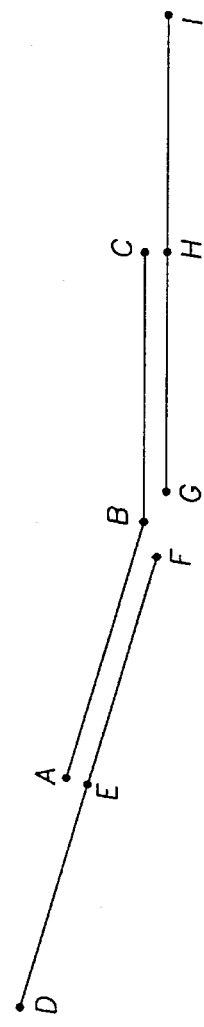
FIG. 13B is a diagram representing the axes of the threaded connections of the pipes and sleeve and the axes of the outer cylindrical surface of the pipes of the coupling assembly of FIG. 13A.

Referring now to FIG. 13B, there is schematically shown the relationship of the threads of boxes 380, 382, the threads of pine 316, 318, and the outer cylindrical surfaces of pipe bodies 313 and 315. Axis AB represents the axis of threads 387, 383 of box 382 and axis EF represents the axis of threads 322 of pin 318. Axis AB and EF coincide and are common with axis 328. Axis DE is the axis of the outer cylindrical surface 317 of pipe body 315 of lower pipe 314. Axis DE is common with axes AB and EF and therefore also has as its common axis, axis 328. Axis BC represents the axis of threads 381, 385 of box 380 and axis GH represents the axis of threads 323 of pin 316. Axis BC and GH coincide and have the axis 329. Axis HI has an axis common with axes BC and GH in that its axis is axis 329.

Referring again to FIG. 13A, axis 328 deviates from axis 329 at center 355 so as to form the bend angle of coupling 310. This bend angle is not adjustable.

Figure 14A:
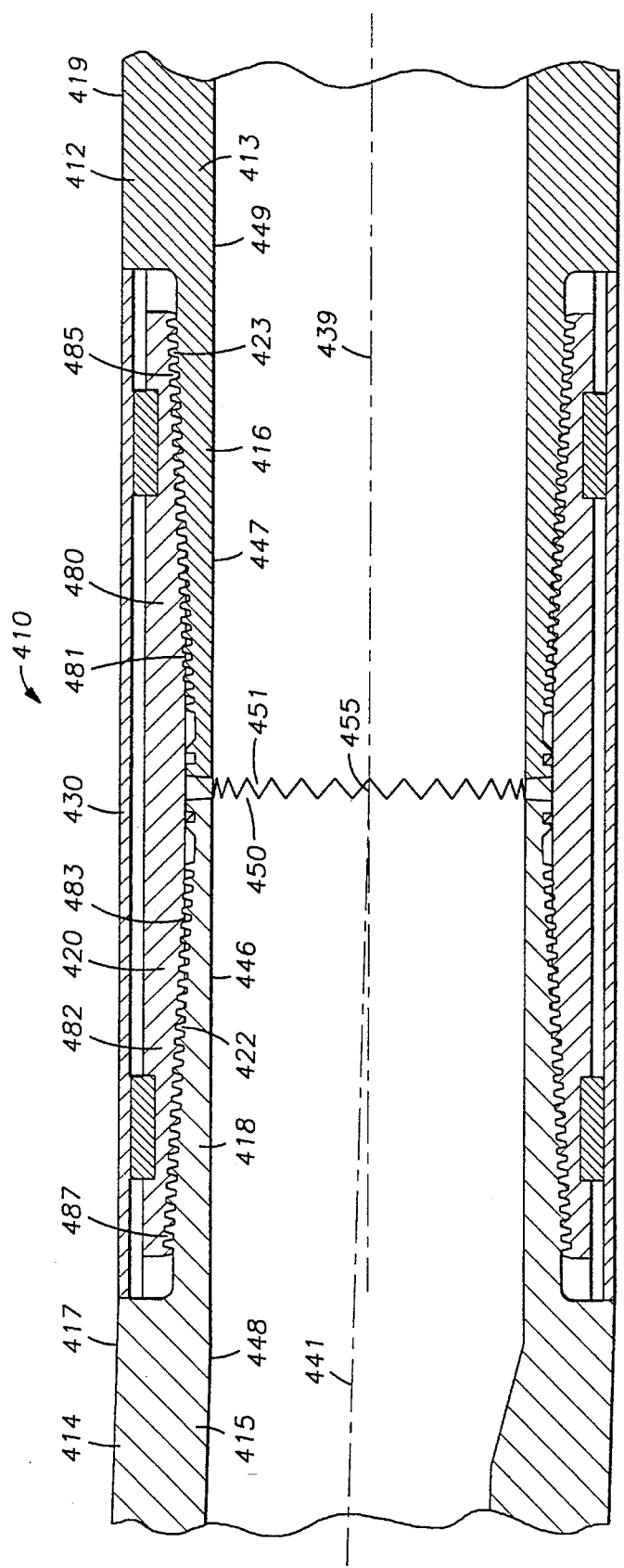
FIG. 14A is a cross-sectional side view of a fourth alternative embodiment of the angular alignment coupling assembly of the present invention with a fourth modified axes of the threaded connections and outer pipe surfaces.

Referring now to FIG. 14A, there is shown another alternative to the first embodiment of the angular alignment coupling of FIG. 13 with modified axes of the threaded connections and outer pipe surfaces. Angular alignment coupling 410 includes an upper pipe 412 and a lower pipe 414 connected by a sub 420 and an outer sleeve 430. In this embodiment, the inner and outer cylindrical surfaces 449, 419 of main pipe body 413, the inner cylindrical surface 447 of pin 416, the conical shape formed by threads 481, 485 of box 480, the conical shape formed by threads 423 of pin 416, the inner cylindrical surface 446 of pin 418, the conical shape formed by threads 487, 483 of box 482, and the conical shape formed by threads 422 of pin 218, all have a common axis 439. The inner and outer cylindrical surfaces 448, 417 of pipe body 415 of lower pipe 414 have an axis 441.

Figure 14B:
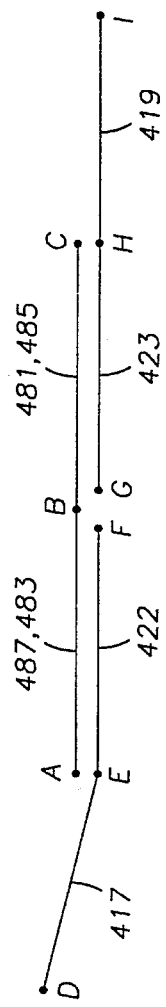
FIG. 14B is a diagram representing the axes of the threaded connections of the pipes and sleeve and the axes of the outer cylindrical surface of the pipes of the coupling assembly of FIG. 14A.

Referring now to FIG. 14B, there is schematically shown the relationship of the threads of boxes 480, 482, the threads of pins 416, 418, and the outer cylindrical surfaces of pipe bodies 413, 415. Axis AB represents the axis of threads 487, 483, axis BC represents the axis of threads 481, 485 of box 480, axis EF represents the axis of threads 422 of pin 418, axis GH represents the axis of threads 423 of pin 416, and axis HI represents the axis of outer cylindrical surface 419 of pipe body 413. Axes AB, BC, EF, GH, and HI all coincide and are common with axis 439 shown in FIG. 14A. Axis DE represents the axis of the outer cylindrical surface 417 of pipe body 415 of lower pipe 414 which is common to axis 441. Axis 441 diverges from axis 439 and as best shown in FIG. 14A, forms a bend angle with axis 439 at center 455.

Figure 15A:
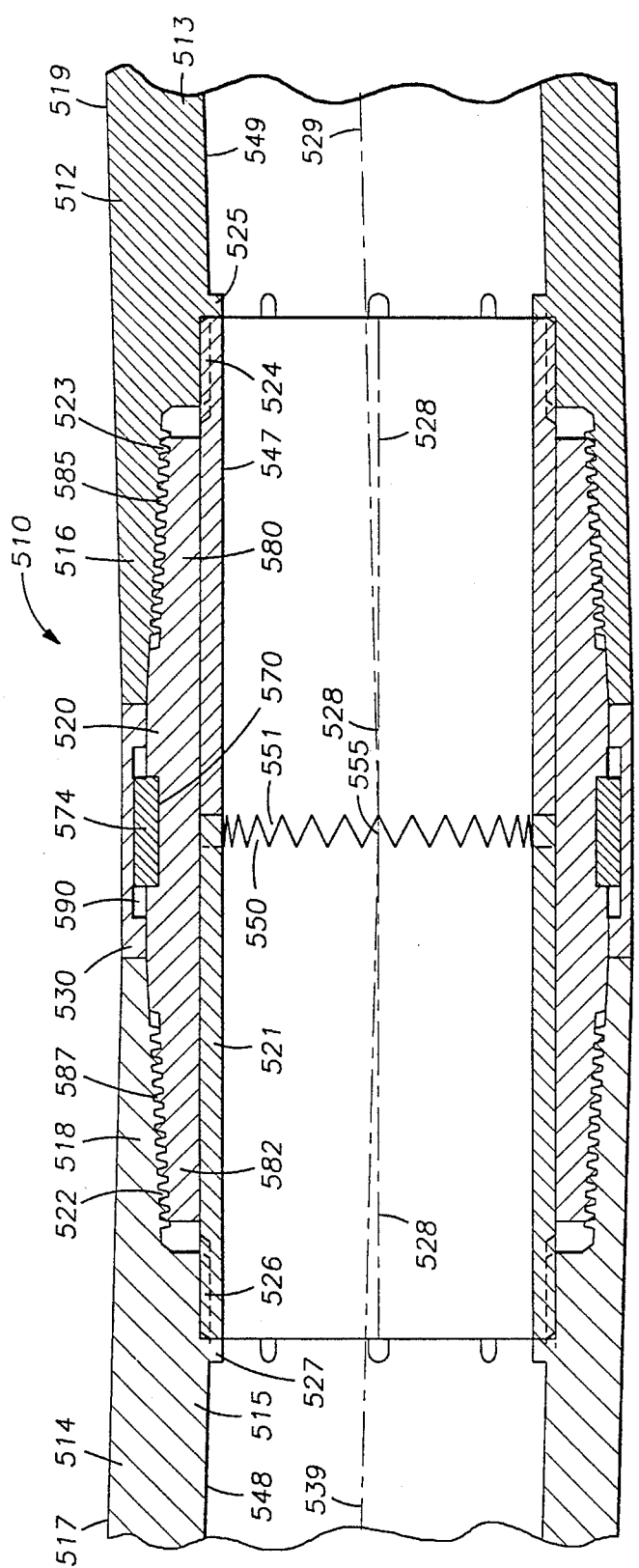
FIG. 15A is a cross-sectional side view of a second embodiment of the coupling assembly of the present invention.

Referring now to FIG. 15A, there is shown a second embodiment of the coupling assembly. Coupling 510 includes an upper pipe 512 and a lower pipe 514 connected by a middle sub 520, an interior sleeve 521 and outer sleeve 530. Middle sub 520 includes a pin 580 having threads 585 which threadingly engages with the threads 523 on a box 516 on upper pipe 512 and further includes a pin 582 having threads 587 which threadingly engages threads 522 on a box 518 of lower pipe 514. Outer sleeve 530 includes a key way 590 and middle sub 520 includes a key slot 570 for receiving a key 574 such that upon rotation of outer sleeve 530, middle sub 520 is rotated. Interior sleeve 521 is preferably made up of two cylindrical sections with their outer terminal ends splined at 524 and 526 to upper and lower pipe 512, 514, respectively. It should be appreciated that sleeve 521 may be one piece. The inner terminal ends of inner sleeve 521 include dogs 551 and 550 for the transmission of torque. The outer terminal ends of inner sleeve 521 abut annular shoulders 525 and 527 of upper pipe 512 and lower pipe 514, respectively. In this embodiment, the inner and outer cylindrical surfaces 549, 519 of main pipe body 513 have an axis 529. The inner cylindrical surface 547 of inner sleeve 521, the conical shapes generated by threads 585 of pin 580 and threads 523 of box 516, and the conical shapes of threads 587 of pin 582 and threads 522 of box 518, all have a common axis 528. The inner and outer cylindrical surfaces 548 and 517 of main pipe body 515 have an axis 539.

Figure 15B:
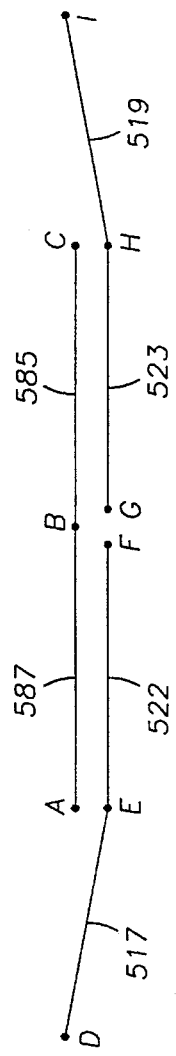
FIG. 15B is a diagram representing the axes of the threaded connections of the pipes and sleeve and the axes of the outer cylindrical surface of the pipes of the coupling assembly of FIG. 15A.

Referring now to FIG. 15B, there is schematically shown the relationship of the threads of pins 580, 582, the threads of boxes 516, 518, and the outer cylindrical surfaces of pipe bodies 513, 515. Axes AB formed by threads 587, axis BC formed by threads 585, axes EF formed by threads 522, and axes GH formed by threads 523 are coincident and have the common axis 528. Axes HI of outer cylindrical surface 519 is axis 529 which diverges from axis 528. Axes DE of outer cylindrical surface 517 of pipe body 515 is axis 539 which also diverges from axis 528. As best shown in FIG. 15A, axes 529 and 539 cross at center 555 to form the bend angle of coupling 510.

Figure 16A:
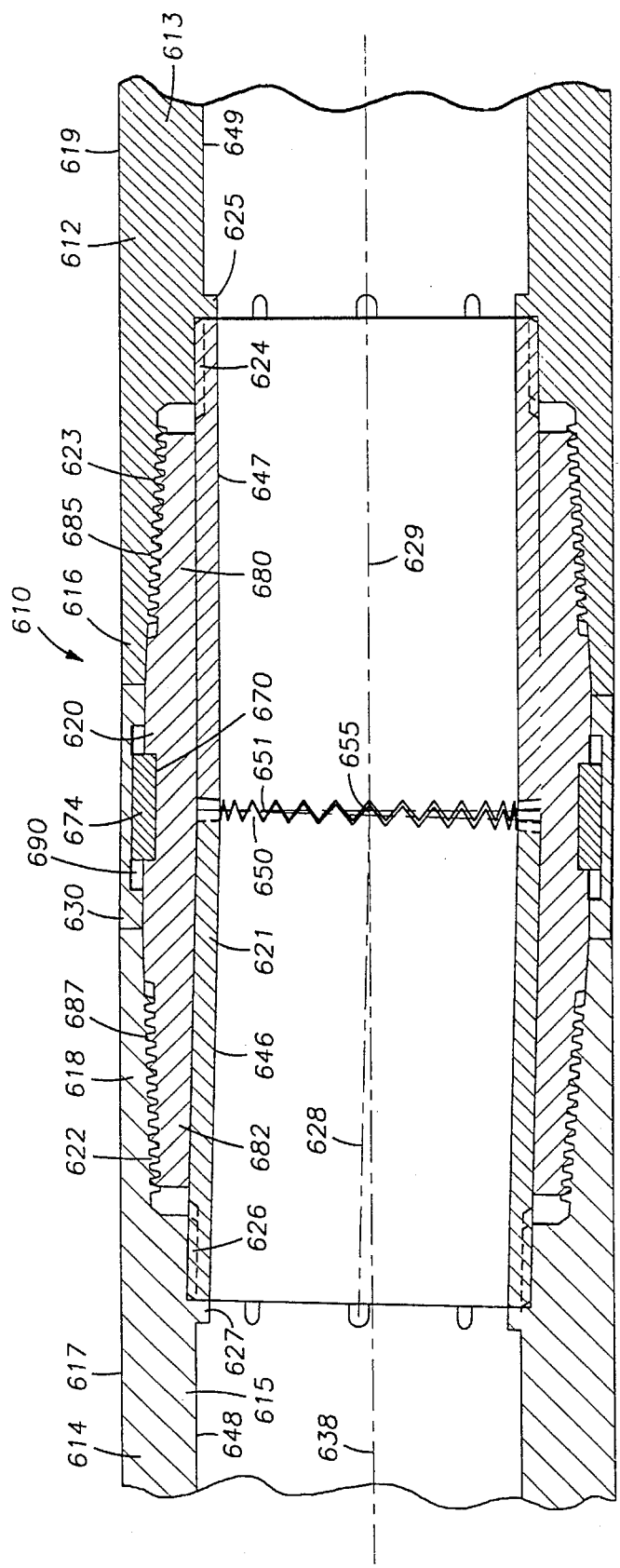
FIG. 16A is a cross-sectional side view of the second embodiment of the coupling assembly of the present invention with a first modified axes of the threaded connections and outer pipe surfaces.

Referring now to FIG. 16A, there is shown an alternative to the second embodiment of the coupling assembly of FIG.

15 with modified axes of the thread connections and the outer cylindrical surfaces of the pipe bodies. Coupling assembly 610 includes an upper pipe 612 and a lower pipe 614 connected by a middle sub 620, an interior sleeve 621 and an outer sleeve 630. Middle sub 620 includes a pin 680 having threads 685 which threadingly engage the threads 623 on box 616 on upper pipe 612 and further includes a pin 682 having threads 687 which threadingly engage threads 622 on box 618 of lower pipe 614. Outer sleeve 630 includes a key way 690 and middle sub 620 includes a key slot 670 for receiving a key 674 such that upon rotation of outer sleeve 630, middle sub 620 is rotated. Interior sleeve 621 is made up of two cylindrical sections with their outer terminal ends splined at 624 and 626 to upper and lower pipe 612, 614, respectively. The inner terminal ends of inner sleeve 621 include dogs 651 and 650 for the transmission of torque. The outer terminal ends of inner sleeve 621 abut annular shoulders 625 and 627 of upper pipe 612 and lower pipe 614, respectively.

In this embodiment, the inner and outer cylindrical surfaces 649, 619 of pipe body 613 and the conical shapes formed by threads 623 on box 616 and threads 685 on pin 680 have the common axis 629. The inner cylindrical surface of that portion of interior sleeve 621 disposed within upper pipe 612 also has the common axis 629. The conical shapes formed by threads 622 on box 618 and threads 687 on pin 682 have the axis 628. That portion of interior sleeve 621 disposed within lower pipe 614 also has the common axis 628. The inner and outer cylindrical surfaces 648, 617 of pipe body 615 of lower pipe 614 have the axis 638 which may be parallel to or in line with axis 629 as shown in FIG. 16A. The deviation of axis 628 with axis 629 causes the formation of the bend angle of coupling assembly 610.

Figure 16B:
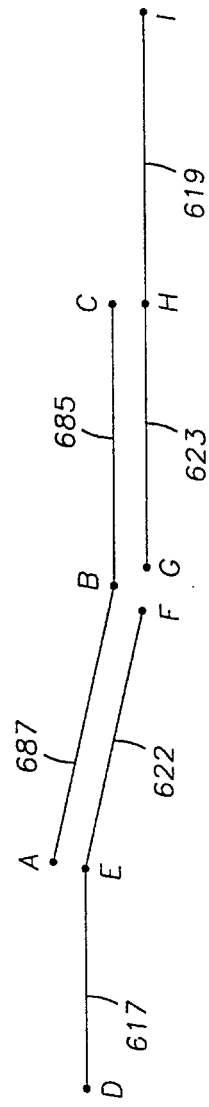
FIG. 16B is a diagram representing the axes of the threaded connections of the pipes and sleeve and the axes of the outer cylindrical surface of the pipes of the coupling assembly of FIG. 16A.

Referring now to FIG. 16B, there is schematically shown the relationship of the threads of pins 680, 682, the threads of boxes 616, 618, and the outer cylindrical surfaces of pipe body 613, 615. Axes AB formed by threads 687 and axes EF formed by threads 622 are coincident and have the common axis 628. Axes BC formed by threads 685, axes GH formed by threads 623, and axes HI formed by outer cylindrical surface 619 all have the same axes, i.e. axis 629. Axis DE is formed by outer cylindrical surface 617 of pipe body 615 which is axis 638. As best shown in FIG. 16A, axes 628 and 629 cross at center 655 to form the bend angle of coupling 610.

Figure 17A:
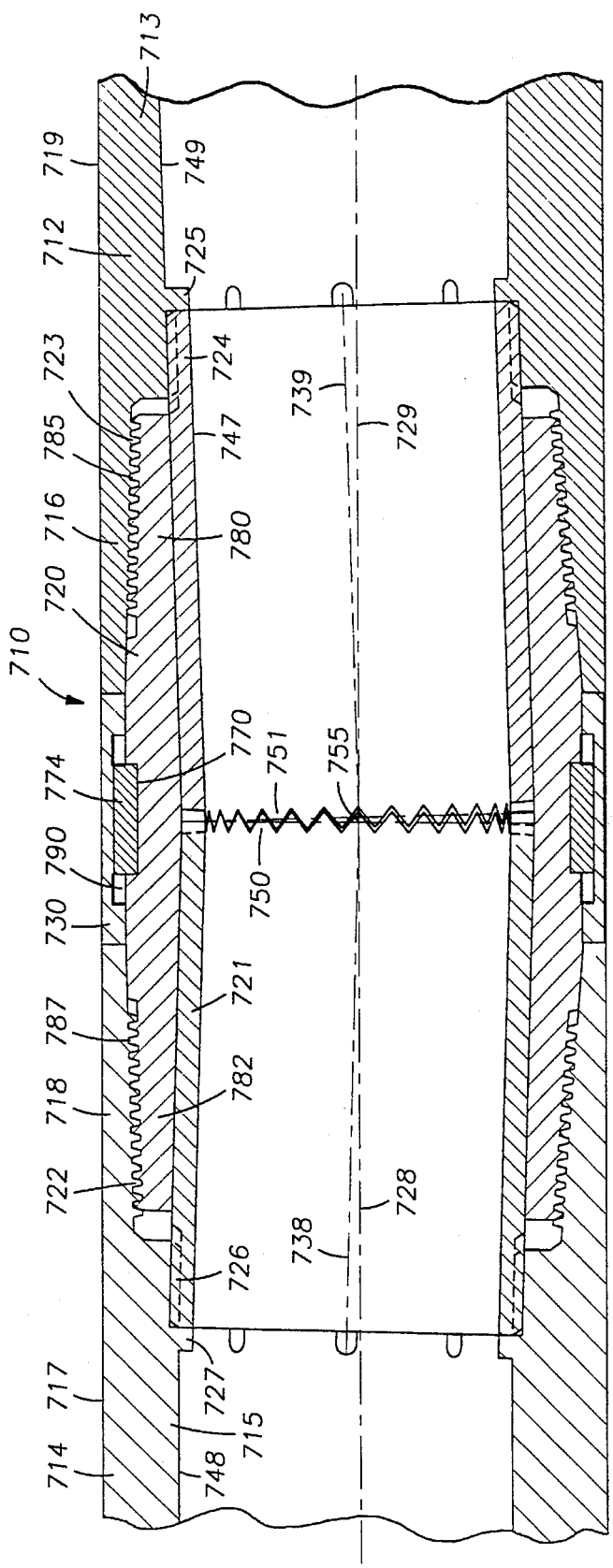
FIG. 17A is a cross-sectional side view of the second embodiment of the coupling assembly of the present invention with a second modified axes of the threaded connections and outer pipe surfaces.

Referring now to FIG. 17A, there is shown a still further alternative to the second embodiment of the coupling assembly of FIG. 15 with modified axes of the threaded connections and the outer cylindrical surfaces of the pipe bodies. Coupling assembly 710 includes an upper pipe 712 and a lower pipe 714 connected by a middle sub 720, and interior sleeve 721, and an outer sleeve 730. Middle sub 720 includes a pin 780 having threads 785 which threadingly engage the threads 723 on box 716 on upper pipe 712 and further includes a pin 782 having threads 787 which threadingly engage threads 722 on box 718 of lower pipe 714. Outer sleeve 730 includes a key way 790 and middle sub 720 includes a key slot 770 for receiving a key 774 such that upon rotation of outer sleeve 730, middle sub 720 is rotated. Interior sleeve 721 is made of two cylindrical sections with their outer terminal ends splined at 724 and 726 to upper and lower pipes 712, 714, respectively. The inner terminal ends of inner sleeve 721 include dogs 751 and 750 for the transmission of torque. The outer terminal ends of inner sleeve 721 abut annular shoulders 725 and 727 of upper pipe 712 and lower pipe 714, respectively.

In this embodiment, the inner and outer cylindrical surfaces 749, 719 of pipe body 713 have the axis 729. The conical shape formed by threads 723 on box 716 and threads 785 on pin 780 have the axis 739. The inner cylindrical surface of that portion of interior sleeve 721 disposed within upper pipe 712 has the common axis 739. The conical shape formed by threads 722 on box 718 and threads 787 on pin 782 have the axis 738. That portion of interior sleeve 721 within lower pipe 714 also has the axis 738. The inner and outer cylindrical surfaces 748, 717 of pipe body 715 have the axis 728. The deviation of axes 738 and 739 form the bend angle of coupling assembly 710.

Figure 17B:
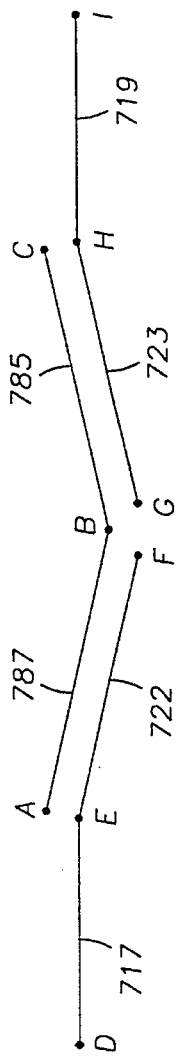
FIG. 17B is a diagram representing the axes of the threaded connections of the pipes and sleeve and the axes to the outer cylindrical surface of the pipes of the coupling assembly of FIG. 17A.

Referring now to FIG. 17B, axis AB formed by threads 787 and axis EF formed by threads 722 are coincident and have the common axis 738. Axis BC formed by threads 785 and axis GH formed by threads 723 are also coincident and have the common axis 739. Axis DE formed by outer cylindrical surface 717 has axis 728 and axis HI formed by outer cylindrical surface 719 having axis 729 are parallel and may be in line with each other. As best shown in FIG. 17A, the deviation of axes 738 and 739 form the bend angle at center 755.

Referring now to FIG. 18A, there is shown a third embodiment of the coupling assembly of the present invention. Coupling assembly 810 includes an upper pipe 812 and lower pipe 814 connected by a middle sub 820 and an outer sleeve 830. Middle sub 820 includes a box 880 with threads 885 which threadingly engage threads 823 on pin 816 of upper pipe 812. Pin 816 includes a cylindrical skirt 845 which is splined at 821 to the body 815 of lower pipe 814. Outer sleeve 830 includes a key way 890 which receives a key 874 disposed in key slot 870 on the outer circumference of middle sub 820. Middle sub 820 further includes a pin 882 having threads 887 which threadingly engage threads 822 on box 818 on lower pipe 814. The rotation of outer sleeve 830 rotates middle sub 820 to connect upper and lower pipes 812, 814. In this embodiment, the inner and outer cylindrical surfaces 849, 819 and the inner cylindrical surface 847 of pin 816 have the same common axis 839. The conical shape formed by threads 885 of box 880 and the threads 823 of pin 816 and the conical shape formed by threads 887 of pin 882 and the threads 822 of box 818 all have the common axis 829. The inner and outer cylindrical surfaces 848, 817 of pipe body 815 of lower pipe 814 have the axis 838.

Referring now to FIG. 18B, there is schematically shown the relationship of the threads of pin and box 816, 880, box and pin 818, 882, and the outer cylindrical surfaces of pipe bodies 813, 815. Axis AB formed by threads 887 and axis EF formed by threads 822 are coincident and have the axis 829. Likewise, axis BC formed by threads 885 and axis GH formed by threads 823 are coincident and also have the common axis 829. Axis DE formed by outer cylindrical surface 817 has axis 838 and axis HI formed by outer cylindrical surface 819 has axis 839. Axes 838 and 839 deviate at center 855 to form the bend angle of coupling assembly 810. The embodiment of FIG. 18 can be made into an angular alignment sub by having either axes DE and EF coincident or axes GH and HI coincident.

In the present invention, the coupling assembly can connect first and second pipes that are straight or pipes that are bent or pipes that have an angle or angles in their longitudinal axis. The middle sub can also be straight or have an angle in the longitudinal axis between its two threaded sections. In other words, a combination of two pipes or more can have an angle in their longitudinal axis so that the coupling assembly between the pipes can allow for adjusting the angle between the pipes by setting the circumferential location between the two pipes and using a make-up torque range for assembly. The coupling, of course, could also be used as a high torque connection without any bends.

The coupling assembly can also be used as a fixed angle connection with the circumferential direction being adjustable. The middle sub can have an angle in the longitudinal axis so that by setting the circumferential location between the two pipes and using a make-up torque range for the assembly, the circumferential direction of the coupling assembly can be infinitely adjustable.

While a preferred embodiment of the invention has been shown and described, modifications thereof can be made by one skilled in the art without departing from the spirit of the invention.

I claim:

1. An angularly adjustable coupling comprising:
   a first tubular member having a tubular body with a first axis and a first threaded end with a second axis;
   a second tubular member having a tubular body with a third axis and a second threaded end with a fourth axis;
   a first cylindrical member having first threads threaded for engagement with said first threaded end upon rotation of said first cylindrical member in a direction and having second threads threaded for engagement with said second threaded end upon rotation of said first cylindrical member in said direction, said first threads having an axis coinciding with said second axis and said second threads having an axis coinciding with said fourth axis;
   one of said axes being at an angle with at least one of the other axes; and
   said first and second threaded ends having intermeshing teeth for setting said angle whereby said intermeshing of said intermeshing teeth may be altered to adjust said angle.

2. The coupling of claim 1 wherein said first axis forms an angle with said third axis.

3. The coupling of claim 1 wherein said fourth axis is at an angle with said first axis, said second axis, and said third axis.

4. The coupling of claim 3, wherein said first axis and said second thread axis forms an angle with said third axis.

5. The coupling of claim 1 wherein said second axis forms an angle with said fourth axis.

6. The coupling of claim 1 wherein said first axis and said second axis forms an angle with said third axis and said fourth axis.

7. The coupling of claim 1 wherein said third axis forms an angle with said first axis, said second axis and said fourth axis.

8. The coupling of claim 1 further including a second cylindrical member receiving said first cylindrical member and having means for limiting the threaded engagement of said first and second tubular members with said first cylindrical member.

9. The coupling of claim 8 wherein said means includes terminal ends on said second cylindrical member which abut said first and second tubular members.

10. The coupling of claim 8 further including a cooperative member disposed between said first and second cylindrical members for the transmission of rotational motion between said second cylindrical member and said first cylindrical member.

11. An angularly adjustable coupling comprising:
    a first tubular member having a tubular body with a first axis and a first threaded end with a second axis;
    a second tubular member having a tubular body with a third axis and a second threaded end with a fourth axis;
    a first cylindrical member having a central cylindrical portion, a first threaded connection with a fifth axis, and a second threaded connection with a sixth axis;
    a second cylindrical member receiving said first cylindrical member and having at least one cooperative member engaging both said first and second cylindrical members for the transmission of torque;
    said first threaded connection threadingly engaging said first threaded end by right-hand threads and said second threaded connection threadingly engaging said second threaded end by left-hand threads upon a rotation of said first and second cylindrical members;
    said second, fourth, fifth and sixth axes coinciding on a common axis with said first and third axes being at an angle to said common axis; and
    said first and second threaded ends having terminal ends with intermeshing teeth.

12. The coupling of claim 11 wherein said first cylindrical member is allowed to slide axially with respect to said second cylindrical member.

13. The coupling of claim 11 wherein said second cylindrical member has terminal ends which abut first and second shoulders on said first and second tubular members, respectively.

14. The coupling of claim 13 wherein said terminal ends of said second cylindrical member form metal-to-metal seals with said first and second shoulders.

15. The coupling of claim 11 wherein said cooperative member is disposed in a spline on said second cylindrical member and a slot on said first cylindrical member.

16. The coupling of claim 11 further includes seal members disposed on said first and second threaded ends for sealingly engaging said central cylindrical portion.

17. An angularly adjustable coupling comprising:
    a first tubular member having a tubular body and a first threaded end with a common first axis;
    a second tubular member having a tubular body with a second axis and a second threaded end with a third axis;
    a first cylindrical member having a central cylindrical portion, a first threaded connection with a fourth axis, and a second threaded connection with a fifth axis;
    a second cylindrical member receiving said first cylindrical member and having at least one cooperative member engaging both said first and second cylindrical members for the transmission of torque;
    said first threaded connection threadingly engaging said first threaded end by threads threaded in a first direction and said second threaded connection threadingly engaging said second threaded end by threads threaded in an opposite direction upon a rotation of said first and second cylindrical members;
    said fourth axis coinciding with said first axis;
    said third axis coinciding with said fifth axis;
    said third and fifth axes being at an angle to said first axis and said second axis; and
    said first and second threaded ends having terminal ends with intermeshing teeth;

18. An angular coupling comprising:
    a first tubular member having a tubular body and a first threaded end with a common first axis;
    a second tubular member having a tubular body and a second threaded end with a common second axis;
    a first cylindrical member having a central cylindrical portion, a first threaded connection with a third axis, and a second threaded connection with a fourth axis;

a second cylindrical member receiving said first cylindrical member and having at least one cooperative member engaging both said first and second cylindrical members for the transmission of torque;

said first threaded connection threadingly engaging said first threaded end by threads threaded in a first direction and said second threaded connection threadingly engaging said second threaded end by threads threaded in an opposite direction upon a rotation of said first and second cylindrical members;

said third axes coinciding with said common first axis and said fourth axis coinciding with said common second axis with said common first axis being at an angle to said common second axis; and said first and second threaded ends having terminal ends with intermeshing teeth.

19. An angular coupling comprising:

a first tubular member having a tubular body and a first threaded end with a common first axis;

a second tubular member having a tubular body with a second axis and a second threaded end with a third axis;

a first cylindrical member having a central cylindrical portion, a first threaded connection with a fourth axis, and a second threaded connection having a common axis with said fourth axis;

a second cylindrical member receiving said first cylindrical member and having at least one cooperative member engaging both said first and second cylindrical members for the transmission of torque;

said first threaded connection threadingly engaging said first threaded end by threads threaded in one direction and said second threaded connection threadingly engaging said second threaded end by threads threaded in an opposite direction upon a rotation of said first and second cylindrical members;

said third axis and four axis coinciding with said common first axis with said common first axis being at an angle to said second axis; and said first and second threaded ends having terminal ends with intermeshing teeth.

* * * * *